Jan. 25, 1944.   L. E. SODERQUIST   2,340,231
VULCANIZING PRESS
Original Filed April 1, 1938   6 Sheets-Sheet 1

INVENTOR
LESLIE E. SODERQUIST

BY

ATTORNEYS

Jan. 25, 1944.  L. E. SODERQUIST  2,340,231
VULCANIZING PRESS
Original Filed April 1, 1938    6 Sheets-Sheet 2

Fig.-2

INVENTOR
LESLIE E. SODERQUIST
BY
ATTORNEYS

Fig. 3

Jan. 25, 1944.  L. E. SODERQUIST  2,340,231
VULCANIZING PRESS
Original Filed April 1, 1938    6 Sheets-Sheet 6

INVENTOR
LESLIE E. SODERQUIST
BY
ATTORNEYS

Patented Jan. 25, 1944

2,340,231

UNITED STATES PATENT OFFICE 2,340,231

VULCANIZING PRESS

Leslie E. Soderquist, Akron, Ohio, assignor to
The McNeil Machine & Engineering Company,
Akron, Ohio, a corporation of Ohio Application April 1, 1938, Serial No. 199,417
Renewed June 26, 1939

12 Claims. (Cl. 18—17)

The present invention relates to vulcanizing presses and particularly to presses which are primarily adapted and intended for use in the vulcanization of pneumatic tires, it being the object of the invention to improve upon existing press designs and to secure new and beneficial results, as will be more fully set forth. More specifically the invention is an improvement upon the mechanical operating means for causing one mold section to effect stripping of a tire from the press as shown in the copending application of Otto J. Kuhlke, Ser. No. 230,970, filed September 21, 1938.

The press of this invention is of the individual type, that is to say that the tire is vulcanized between upper and lower mold sections which are heated, preferably by steam jackets. Presses of this type are well known in the art, but the present invention introduces new movements during the opening and closing operations which give rise to new and beneficial results not present in earlier types of presses. While the invention is adapted to and shown with a single tire cavity, the principles thereof may be incorporated in presses which have a plurality of molding cavities, such, for example, as dual or twin tire presses.

One of the primary features of the invention is the provision of means whereby the movable mold section (where only one section moves), is operated in a distinctive path so that it functions to strip the tire from the mold. Of course this principle may be employed where both sections move, but for the purpose of illustration the simpler form is shown and described. Briefly stated, the operation consists in shifting one mold section laterally with respect to the other section at the beginning of the opening movement. This causes the tire, which is held at this time by the non-skid tread formation, to strip at one side from one mold element and at the other side from the other mold element. By this movement the tire is peeled or stripped from the mold without making it necessary to provide any separate ejecting means. The tire will be lifted by its forward, upper tread surface so that it moves into a diagonal plane as the press continues to open, and as the press approaches its fully opened position, the tire will drop out of the upper half. The operation of the press also makes it possible to utilize mechanical means to convey the tire away as it is practical to employ a hook or mechanically operated arm which will enter the opening between the mold sections below the tire just as it is ready to free itself from the non-skid formation in the upper or movable mold section.

The invention further contemplates the provision of means whereby the upper section, in its closing operation, approaches the lower section in a substantially straight line so that the mold is properly closed about the green or unvulcanized tire. This movement in closing may be at right angles to the face of the lower section, or at an angle slightly oblique thereto.

It is a further object of the invention to provide automatically operating mechanism which conveys the movable mold section through its peculiar path and to so construct and coordinate the operation of the device to secure the movements desired.

It is also a purpose of the invention to provide a powerful opening and closing mechanism which will produce a firm and positive closing movement, and to provide mechanical driving means for the operating parts so that the entire mechanism may be motor driven.

Other objects and advantages will appear from the drawings and detailed description contained herein, it being understood that the disclosure is the best and preferred form of the invention and that improvements and changes may be made in specific embodiments without departing from the essential features of the invention.

It will also be understood that the features of the invention which relate to means for operating the movable mold section may be applied to presses for vulcanizing other articles than automobile tires, such, for example, as tubes, bicycle tires, and other articles of vulcanized rubber.

In the drawings, in which the preferred form of vulcanizing press is shown.

Before entering into a detailed description of the various operating instrumentalities, it will be observed that the peculiar travel of the movable mold section, here shown as the upper mold section, is caused by the cooperation of several instrumentalities. One of these instrumentalities is the lever mechanism which is controlled and operated directly from a main drive shaft. This mechanism comprises pivoted linkage by which the upper mold lid is raised and lowered and by which the final pressure is imparted to the movable section to effectively close the mold sections during the vulcanizing operation.

The upper or movable mold section is pivoted to one of the levers to provide for a floating action so that it may be shifted or dragged across the lower or stationary mold section at the initiation of the opening movement, which operation serves to strip the tire from the mold sections. The upper section is then tilted upwardly to fully open position while being moved bodily by the lever mechanism. In the closing movement the upper section is rocked on the lever mechanism until it assumes a position in substantially parallel relation to the lower mold and is then lowered in a straight line so that the new tire may be properly positioned. To control and guide the upper or movable section during its bodily translation, there are provided two cam members, one of which may be termed the pulling or dragging cam and the other the lifting or tilting cam. By varying the contour and relation of these two cams and their relative positions with respect to the lever mechanism, it is possible to give to the movable mold section any specific or desired path. This mechanism gives to the press a degree of flexibility which is wholly novel and original. It will be appreciated that the particular configuration and arrangement of the cams are shown because that is believed to be the best and most efficient mode of operating the press, but the cam construction, controlling the pivoted or floating movable mold section, may be varied and altered without sacrificing the principles of the invention.

Referring now to the details of the drawings.

The mold sections

The stationary mold element, here the lower section, is designated 1 and the movable (upper) mold element or section is designated at 2. Both sections are steam jacketed, as shown in the drawings, being connected to a source of steam. Each element contains a section of the tire molding cavity 3 in which is shown, in Figs. 1, 3 and 4, a molded tire 4 characterized by the non-skid tread formation which is formed therein by the corresponding non-skid formation 5 in the tread area of the tire mold. When the tire is vulcanized, the rubber fills the recesses in the tread design and there is a tendency for the tread of the tire to cling in the formations in the mold and this property is utilized in the present invention to facilitate the removal of the tire from the mold.

Figures 5, 6:
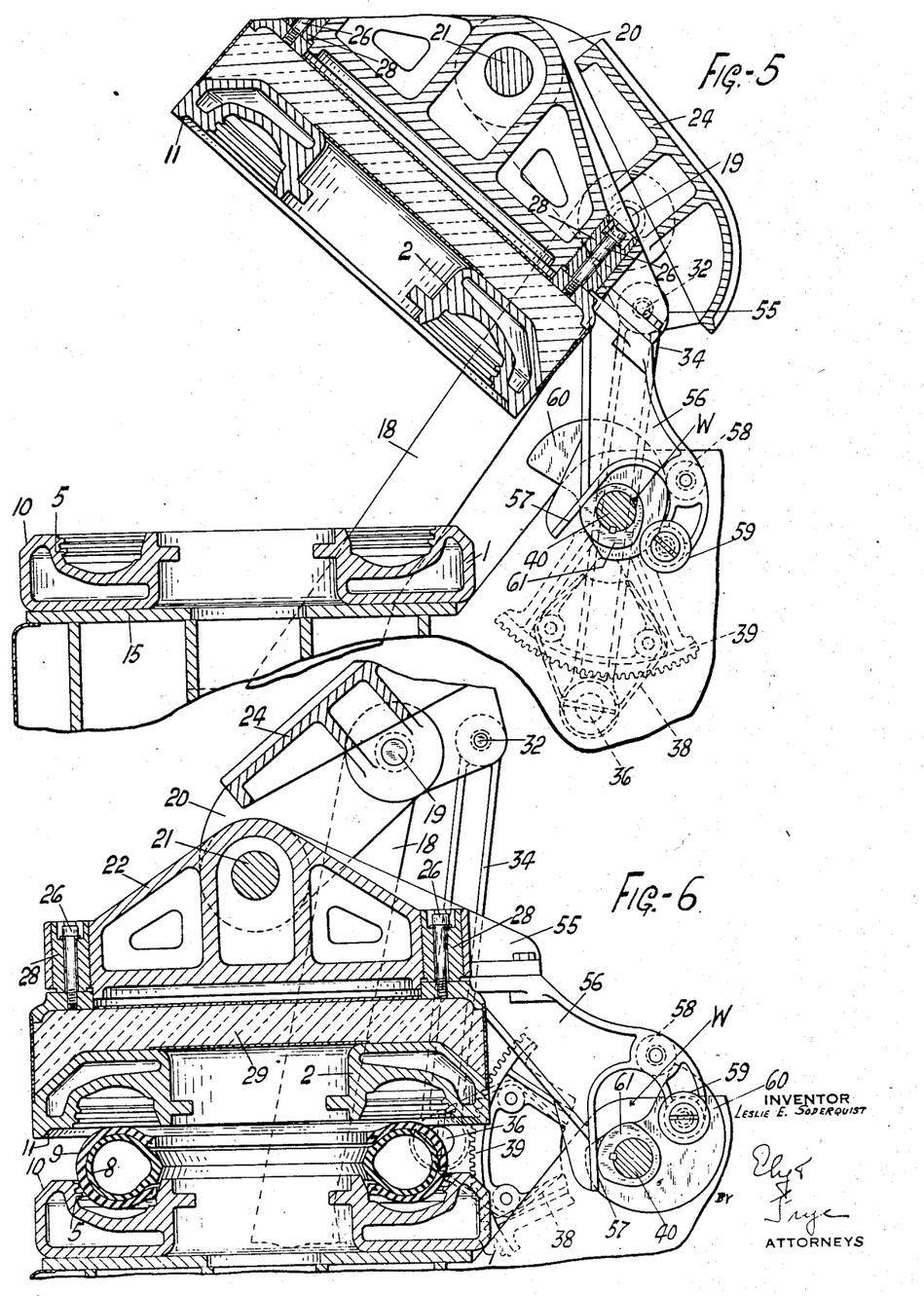
Fig. 5 is a view showing the press fully opened.
Fig. 6 is a view showing the press in its closing movement, or substantially at the point where the final straight-line movement begins.

The tire is shown upon the usual air bag 8 which fits at its inner edge between the beads of the tire. This bag is connected to the usual inflating pressure line common to the art, not shown. An unvulcanized tire 9 is shown in Fig. 6. It will be noted that no bead rings or stripping rings are shown in the drawings, it being unnecessary to employ such devices in this improved press.

As shown in the drawings, the upper and lower mold sections are provided with relatively long bevel registers 10 and 11, respectively, so that the movable section may be dragged across the stationary section at the very beginning of the mold opening movement. It may be found desirable to provide a slight cylindrical or straight register, in which case the control cams will be modified to lift the movable section for a short distance before the oblique or dragging operation is started, but in no case should this lifting movement be continued for any appreciable distance before the oblique movement starts, for otherwise the tire will free itself from the upper half of the mold and the peculiar stripping action which is characteristic of this press cannot be achieved. The stripping operation which is performed here is due to the fact that the tread formation on the tire is interlocked with the recesses in the mold when the oblique movement is started.

The lever mechanism

The lower mold section is fixed upon a base 15 in which is pivoted the stationary shaft 16 which forms the fixed bearing for the lever actuating mechanism. On the ends of the shaft 16 projecting beyond the frame are the two parallel pressure links 18 which extend upwardly beyond the upper mold section and are pivoted at their upper ends, by bearing pins 19, to two rocking arms or levers 20 which extend on either side of the operating centers formed by the pins 19. In their lower ends the levers 20 are connected by the transverse shaft 21 on which is pivoted the heavy platen 22. The levers 20 are connected to the heavy transverse web or bracing member 24 which serves to tie the levers together and is provided with wings 25 which support the bearing pins at their outer ends.

The upper mold section 2 is attached to the platen 22 by means of set screws 26 which are located in adjustable bushings 28 in screw-threaded engagement with the platen. By this means the upper mold may be accurately adjusted with respect to the lower mold so that perfect register is assured. A large chamber may be provided between the upper mold section and the platen and may be filled with insulating material 29.

On the upper end of the rocking arms 20 are located the pivot pins 32 by which the arms 20 are connected to the two operating links 34, the lower ends of which are pivoted on bushings 35 surrounding pins 36 secured to plates 38 which are, in turn, fixed upon the sides of large gears 39.

The gears 39 are fixed to the ends of a main operating shaft 40 supported in the rear of the base 15. This shaft is driven from the gears 39 by pinions 42 attached to a drive shaft 43 also mounted in the frame. Fixed across the base 15 and surrounding the shaft 43 is a motor housing 45 containing a worm gear 46 fixed to the shaft and driven by a worm 48 on the vertical armature shaft 49 of the driving motor 50.

This motor 50 may be automatically controlled by any selected moving part of the press or timing mechanism so that it will be stopped when the mold is in its fully opened and closed positions, but such devices are well known in the art and need not be further described. Also, automatic means may be provided to control the pressure to the air bag as is well known, so that the pressure therein will be admitted to or released from the air bag at the proper time, and this mechanism may also include a timing device for energizing the motor when a fixed period of vulcanization has elapsed.

Figures 1, 9:
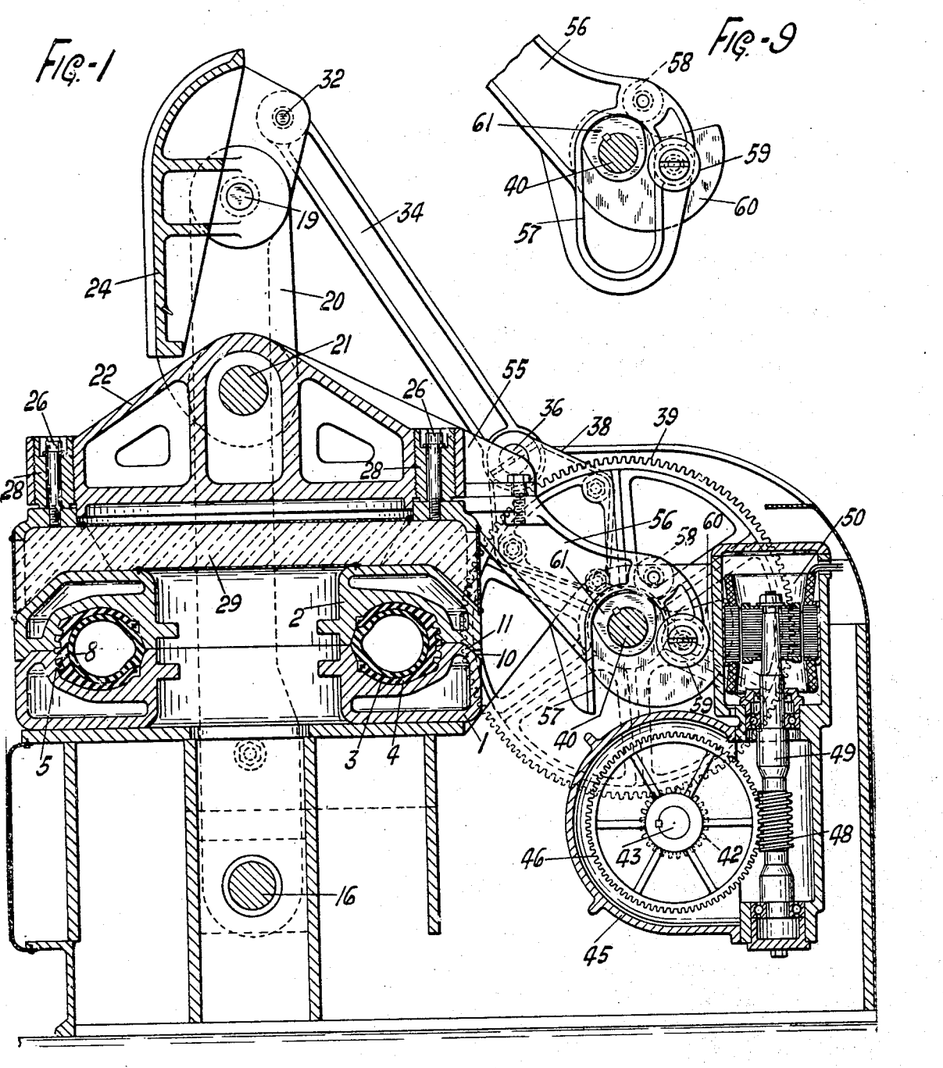
Fig. 1 is a vertical section through the vulcanizing press showing an automobile tire casing therein with the two mold sections in closed or operative position. This view is taken on the line 1—1 of Fig. 2.
Fig. 9 is a view of the cams and the lower end of the controlling arm for the upper or movable mold section.
Figure 2:
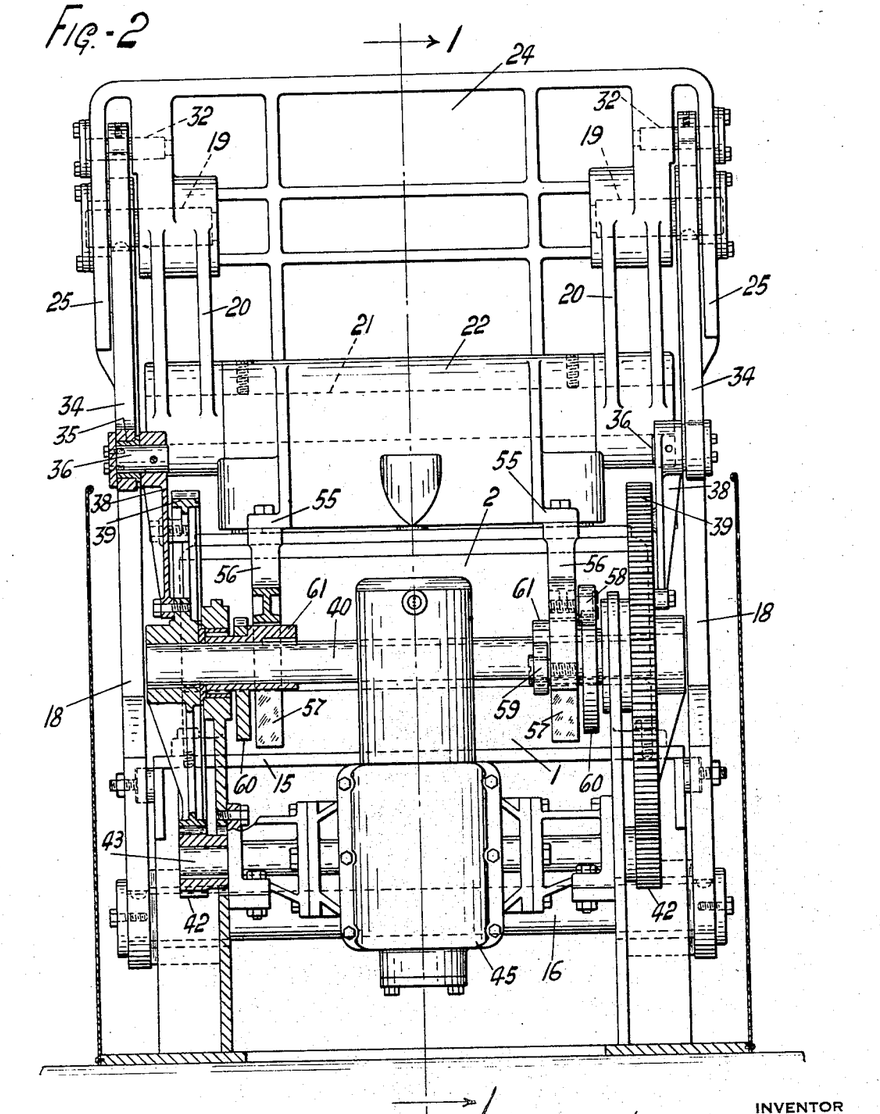
Fig. 2 is an elevation from the rear or right-hand side of Fig. 1, certain of the parts being shown in section.

Reviewing the operation of the lever mechanism and starting with the parts in the position shown in Fig. 1, and assuming that the period prescribed for vulcanization has elapsed, the motor is automatically started by the timing mechanism. This starts the rotation of the shaft 40 in the clockwise direction, drawing the link 34 downwardly. This operation rocks the arms 20 about the pivots 19 moving the arms so that they raise the platen 22. At the same time the links 18 are rocked about their center 16 and the upper mold half swings rearwardly, finally assuming the position shown in Fig. 5 with the mold fully opened, whereupon the motor stops and the parts remain open until the vulcanized tire is removed and a fresh or unvulcanized tire placed in the mold. The mechanism is then started in operation and the continued movement of the shaft 40 reverses the rocking movement of the arms 20, lowering upper mold section into position on the lower mold section, the closing operation being completed when the parts have returned to the position shown in Fig. 1 with the centers 19, 21 and 16 in alignment, or substantial alignment, whereby a powerful closing pressure is exerted upon the mold sections.

The movable mold control

Attention has been directed to the pivotal mounting of the upper mold section, by which it has what may be described as a floating movement during its entire motion of translation to and from opened and closed positions. The means by which the floating movement of the upper mold section is controlled and determined will now be described.

Attached to the rear of the upper mold section are two wings 55 to which are suspended arms 56 referred to as controller or guide arms. The lower ends of the arms are forked as at 57 and pass on either side of the main operating shaft 40. If desired, for further strength the lower end of the forked arms may be closed in, as shown in Fig. 9. On one face of each fork and near its upper end is a roller 58 which may be designated as the lifting roller, and on the opposite face of each fork and on the side removed from the mold is the roller 59 which may be designated as the dragging roller. The side of the fork nearer to the mold is provided with a straight face to cooperate with the dragging cam, as will be described, and is shown in Fig. 6.

Each roller 58 rides upon a lifting cam 60 and each roller 59 is actuated by a dragging cam 61. These cams are fixed to the shaft 40 and, in cooperation with the movement imparted by the lever mechanism, direct and guide the upper mold section in its peculiar movement.

Figures 7, 8:
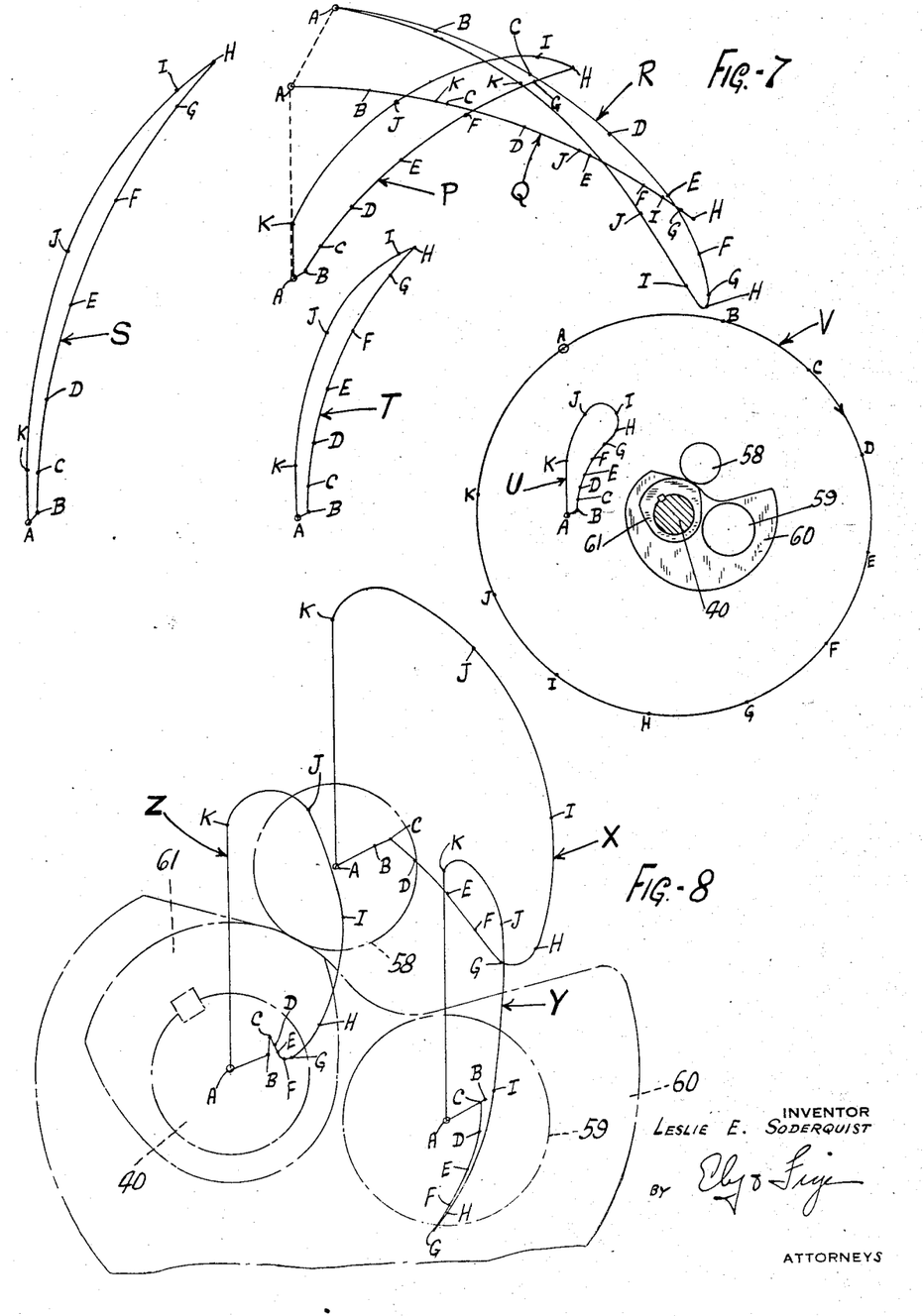
Fig. 7 is a detail view showing the path of movement of the various points in the press mechanism.
Fig. 8 is an enlarged detail showing the relation of the cams to the lifting and drawing or pulling rollers which control the path of the upper mold.

Referring now to Figs. 7 and 8, in which the several positions of the various parts of the apparatus are shown diagrammatically:

The path of the center shaft 21 upon which the platen is carried and about which it rocks, is indicated by the line P (Fig. 7). The path of the shaft 19 is indicated by the line Q, this being an arc about the center 16. The path of the pin or center 32 is indicated by the line R. The path of the point in the mold farthest removed from the shaft 40 is indicated by the line S, that of the midway points by the line T and that of the point nearest the shaft 40 by the line U. The circular orbit of the pin 36, at which point the link 34 is attached to the gear 39, is indicated by the line V. Referring to Fig. 8, the path of the center of the lifting roller 58 is indicated by the line X; the path of the dragging roller 59 is indicated by the line Y. The line Z represents the path of the imaginary point W which is the center of the upper curved portion of the fork.

In both of the views, the period of operation is indicated by the letters A to K inclusive, the point A being the position of the mold when closed, the point B the first movement to the point H when the mold is fully opened. The point K is the beginning of the straight-line movement as the molds close and return to the original A position. Where the cams are shown in outline, the position of the parts is at the A point.

Assuming that the parts are in A position and the shaft starts to rotate to open the mold, the lever mechanism, of course, begins to function at once to raise the upper mold section bodily and to rock it away rearwardly, as shown by the lines P, Q and R. Were the mold fixed, this would give a plain swinging movement to the upper mold section. However, the mold floats or rocks on its pivot, and is controlled and modified by the cams 60 and 61. As the parts begin their opening movement the rollers 58 rise by the action of the cams 60 and immediately the cams 61 move rollers 59 which pull the upper mold section rearwardly so that it drags across the lower mold section in an upward diagonal line from the point A to point B. The outer surface of the cam 60 continues to retreat from the center of the shaft until the point K is reached, at which time the roller drops toward the center of the shaft. At this time the parts are shown in the position of Fig. 6 when the mold is closing and the final movement is in a straight line. At this time the large concentric face of each cam 61 is in contact with a straight side of fork 57 so that the upper half of the mold settles in the straight-line movement.

The movement is the result of the main rocking movement or movement of translation imparted by the lever mechanism, modified by the two control cams which guide the upper mold element so as to cause it to move as shown in Fig. 7. The initial movement is diagonally rearwardly and upwardly, although the faces need not be maintained in accurate parallelism, as might be the case without altering the essentials of the invention. The continued opening movement is a rocking movement, the front of the mold moving appreciably faster than the rear, and this continues in a fairly regular fashion. On the return movement, as shown by the line U, the rear of the mold first moves upwardly while the front of the mold is moving downwardly so that the upper half of the mold rocks toward parallelism with the lower half of the mold and the retarding of the rear side of the mold causes the two mold sections to be in substantial parallelism when the point K is reached. From this point on, the upper mold moves downwardly with its face in substantial or full parallelism with the lower half of the mold.

Résumé

Figure 3:
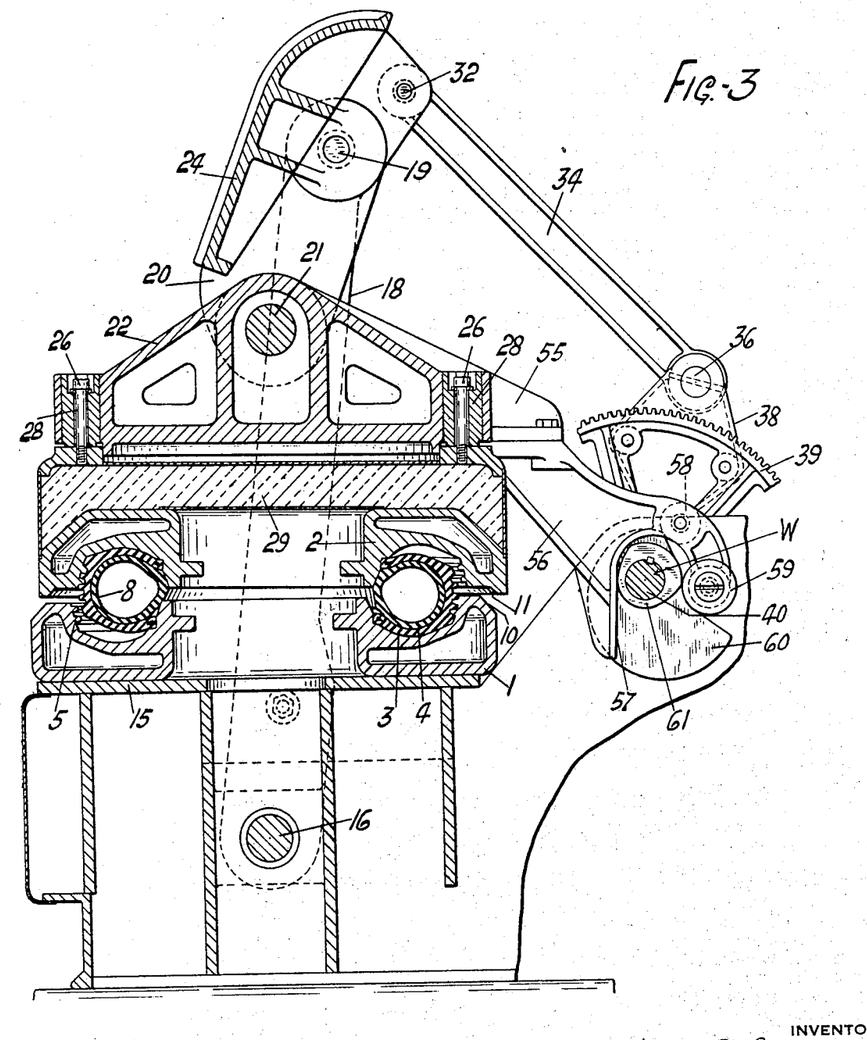
Fig. 3 is a view similar to Fig. 1, showing the press as it begins its opening movement, illustrating the manner in which the tire is freed from the mold.
Figure 4:
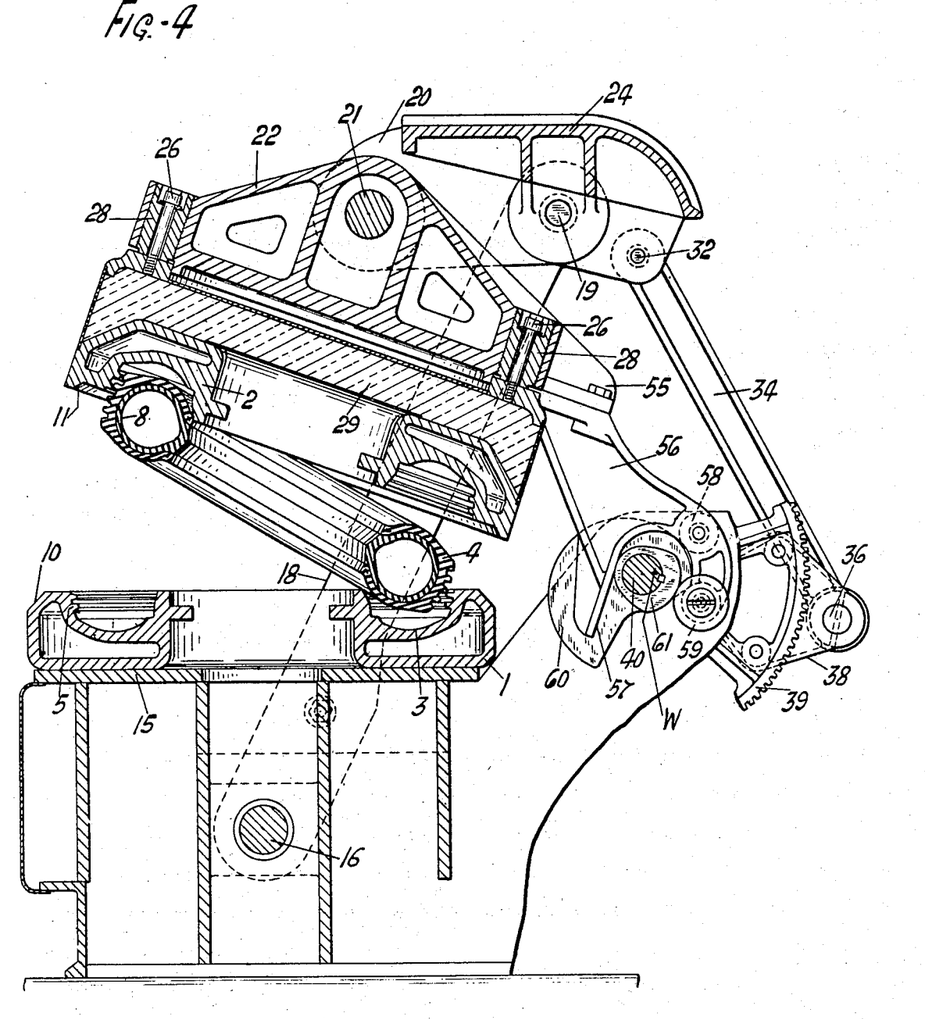
Fig. 4 is a view showing a further stage in the opening of the press, illustrating the manner in which the tire is completely freed from the mold as the press approaches its fully opened position.

In the operation of the present device the tire is caused to perform as follows. As the movable mold is dragged across the fixed mold, the forward side of the tire remains embedded by its non-skid design in the upper half of the mold, while the rear side of the tire is embedded in the non-skid formation in the lower half of the mold. This is shown in Fig. 3. Continued opening movement compresses the tire diametrically between diagonally opposite areas on the tread surface and lifts the front of the tire, which is retained by the non-skid formation. During the opening movement, the tire rocks or rolls progressively out of contact with the inner surface of the mold halves, until it is held solely by the opposite diagonal areas. As the upper mold half reaches the position of Fig. 4, the rear side of the tire is fully extracted from its non-skid formation and then the front side drops away from the upper half of the mold. Thus the tire is automatically stripped by the mere opening action of the press.

On closing, the desirable straight-line movement is secured which centers and locates the new tire in its correct position without danger of pinching the tire at the tread or beads.

While I have shown and described one embodiment of my invention it is to be understood that the invention is not so limited but that various modifications may be resorted to within the spirit of the invention and the scope of the subjoined claims.

What is claimed is:

1. A vulcanizing press comprising a base, a mold member attached to the base, a pivoted arm journaled in the base, a swinging arm on the pivoted arm, means to rock the pivoted and swinging arms in unison, a second mold member pivoted on the swinging arm, and movable cams associated with the second mold member and actuated in timed relation to the movement of the second mold member to control the position of the second mold member while it is being bodily moved by the said arms.

2. A vulcanizing press comprising a base, a mold member attached to the base, a pivoted arm journaled in the base, a swinging arm on the end of the pivoted arm, a link connected to the swinging arm for rocking the two said arms conjointly, a second mold member pivoted on the end of the swinging arm and movable bodily with respect to the other mold member, and rotary cam means associated with the second mold member to rock it upon its pivot during the bodily movement.

3. A vulcanizing press comprising a base, a mold member attached to the base, a pivoted arm journaled on the base, a second mold member carried on the pivoted arm and movable bodily thereby, a plurality of movable cams for controlling movement of the second mold member, and an arm extending from the second mold member and operatively associated with said cams, one of said cams controlling lateral movement of the movable mold member and another of said cams controlling vertical movement of the movable mold member.

4. A vulcanizing press comprising a base, a mold member attached to the base, a pivoted arm journaled on the base, a second mold member carried on the pivoted arm and movable bodily thereby, a shaft in the base, a plurality of cams on the shaft, an arm extending from the second mold member and operatively associated with said cams, one of said cams controlling lateral movement of the second mold member and another of said cams controlling vertical movement of the second mold member, and a link connected to the pivoted arm and to the shaft.

5. In a vulcanizing press, a relatively fixed and a movable mold member, a pivoted arm having a fixed axis, a swinging arm on the end of the pivoted arm, the movable mold member being pivoted on the swinging arm, a rotary shaft, means to actuate the swinging arm from the shaft, a guiding arm attached to the movable mold member, and movable cams actuated in timed relation to the movement of the movable mold member and cooperating with the guiding arm to modify the plane of the movable mold member during its bodily movement.

6. In a vulcanizing press, a relatively fixed and a movable mold member, a pivoted arm having a fixed axis, a swinging arm on the end of the pivoted arm, the movable mold member being pivoted on the swinging arm, a rotary shaft, a link connected to the shaft and to the swinging arm, a guiding arm attached to the movable mold member, and a pair of rotary cam members operatively associated with the guiding arm and operative to modify the movement of the said movable mold member during its operation, one of said cam members controlling lateral movement of the movable mold member and the other controlling vertical movement of the movable mold member.

7. In a tire vulcanizing press, two cooperating mold elements, means to move one of said elements bodily in a generally arc-shaped path to and from the other element, and means to modify the said movement of said movable mold element comprising a movable cam and a guiding arm on the movable mold element cooperating therewith.

8. In a vulcanizing press a relatively fixed cavity member and a movable cavity member associated therewith and means for controlling movement of the movable cavity member comprising an arm attached to the movable cavity member, and a pair of rotary members operatively associated with said arm and operative to modify movement of said movable cavity member during its operation, one of said members controlling lateral movement of the movable cavity member and the other controlling vertical movement of the movable cavity member.

9. Apparatus for use in vulcanizing tires comprising a tire molding cavity member, a second cavity member for embracing one side of a tire protruding from said molding cavity member, rotary means for raising said second cavity member, and rotary means for transversely shifting said second cavity member a substantial distance transversely of its axis while embracing the tire to loosen said tire from said mold cavity.

10. Apparatus for use in vulcanizing tires comprising a tire molding cavity member, a second shiftable cavity member for embracing one side of a tire protruding from said molding cavity member, and rotary means for simultaneously raising and transversely shifting said second cavity member while maintained in embracing relation to said tire to loosen said tire from said mold cavity member.

11. Apparatus for use in vulcanizing tires comprising a tire molding cavity member, a second cavity member for embracing one side of a tire protruding from said molding cavity member, said cavity members being relatively movable away from each other to open the apparatus and toward each other to close the apparatus, rotary means for raising said second cavity member, rotary means for transversely shifting said second cavity member a substantial distance transversely of its axis while embracing the tire to loosen said tire from said mold cavity, and means including said first named means for subsequently bringing the cavity members into substantial parallelism prior to closing the apparatus and to maintain them in parallelism until the apparatus is closed.

12. Apparatus for use in vulcanizing tires comprising a tire molding cavity member, a second shiftable cavity member for embracing one side of a tire protruding from said molding cavity, rotary means for simultaneously raising and transversely shifting said second cavity member while maintained in embracing relation to said tire to loosen said tire from said mold cavity member, and means including said first named means for subsequently bringing the cavity members into substantial parallelism prior to closing the apparatus and to maintain them in parallelism until the apparatus is closed.

LESLIE E. SODERQUIST.